Patented Dec. 2, 1952

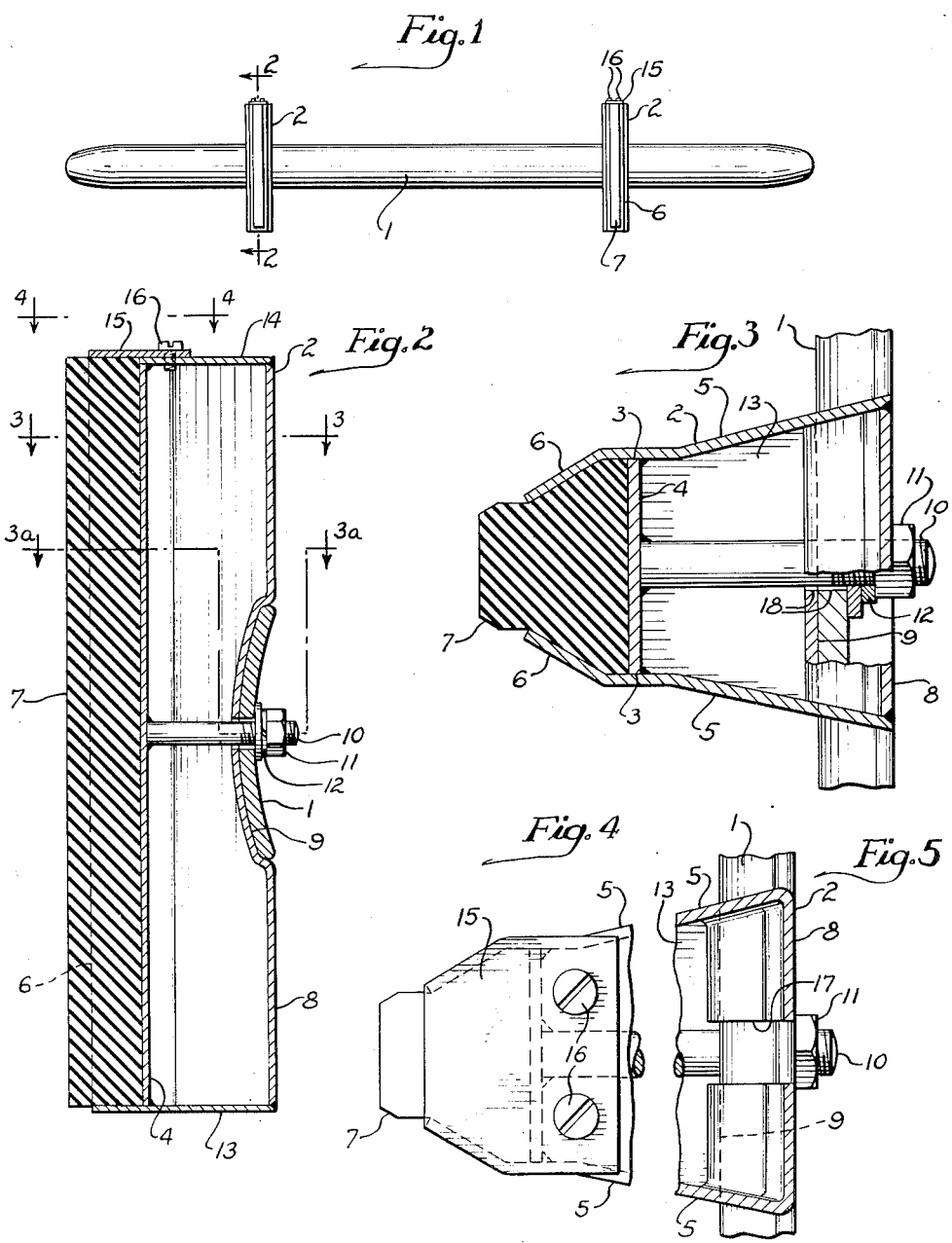

2,620,216

UNITED STATES PATENT OFFICE 2,620,216

RUBBER-FACED BUMPER GUARD

William S. Brand, Chicago, Ill.

Application June 18, 1948, Serial No. 33,720

3 Claims. (Cl. 293—67)

The invention relates to automobile bumpers, and more particularly to removable bumper guards which tend to prevent the bumpers of two different automobiles from engaging with each other, one over the other.

It is an object of the invention to provide bumper guards of this class with removable rubber or other resilient facings which receive the direct contact of interferring bumpers of adjacent automobiles in a line of traffic, and thus avoid the noisy clashing of bumpers which often results in the different bumpers marring or scratching each other.

It is a further object to provide bumper guards of the above class which may be conveniently secured to the bumper proper and likewise removed for replacement and repair.

It is also an object to provide bumper guards with rubber facings of the like which may be readily inserted and replaced as desired.

It is also an object to provide an invention of this class, strong, but light in weight, and economical to manufacture.

Referring to the drawing,

Fig. 1 is a front elevational view of the invention including the usual horizontal bumper and a pair of the new bumper guards;

Fig. 2 is an enlarged cross sectional view taken in the proximity of line 2—2 of Fig. 1;

Fig. 3 is a fragmentary sectional view taken principally in the proximity of line 3—3 of Fig. 2, but having a more detailed portion shown in the proximity of line 3a—3a;

Fig. 4 is a fragmentary end view of one of the bumper guards as seen from line 4—4 of Fig. 2; and Fig. 5 is a fragmentary sectional view corresponding to a part of Fig. 3, but illustrating a modified form of the invention.

Similar characters of reference designate similar parts throughout the drawing.

Referring to Fig. 1, the numeral 1 designates a somewhat conventional horizontal bumper which is usually provided fore and aft of automobiles, motor trucks and other such vehicles, and which I will designate as the main bumper. As there are many ways to secure the main bumpers to vehicles, I do not include such securing means as part of my invention.

The main bumper 1, as illustrated here, is of arcuate cross section as shown in Fig. 2, the convex or crown surface of which faces exteriorly of the vehicle to which it is attached, and co-directional with the bumper guards 2, which are mounted on said crown surface, as will be understood.

The frame work of the bumper guards 2 is preferably constructed of steel. Referring more especially to Fig. 2, and Fig. 3, it will be seen that said bumper guards are of somewhat hollow character. Considering said bumper guards, individually, the longitudinal edges 3 of the backing plate 4 are integrally welded to the side walls 5 at right angles thereto, said side walls extending forwardly from said backing plate and inwardly to form vertical gibs 6, between which the rubber or other resilient facing 7 is confined. The side walls also extend rearwardly from said backing plate and are flared apart for comparatively wide contact with the main bumper 1, as will be understood. The longitudinal edges of the rear wall 8 are welded to the rearward vertical edges of the two side walls 5, said rear wall forming a socket 9 in which the main bumper 1 is nested, the side walls 5 being correspondingly cut away to permit said bumper being held in firm engagement with the sockets 9 by the screw 10 which is integrally attached to the backing plate 4, preferably by welding, and extends through said socket and main bumper for threaded engagement with the nut 11, which is preferably associated with the washers 12.

It will be observed that across the lower ends of the backing plate 4, the rear wall 8, and the side walls 5, including the gibs 6, the bottom plate 13 is welded thereto; and the resilient facing 7 being entered at the top end of the bumper guard is slid in place, downward between the gibs 6, to rest firmly on the bottom plate 13. Across the upper ends of said side walls between said backing plate and said rear wall, the top plate 14 is welded to said plate and walls, but leaving the space between said gibs open for entering said resilient facing as above mentioned. A retaining plate 15 is held across said gibs by screws 16, which engage the top plate 14, by which arrangement said resilient facing may be inserted and kept in place or removed for renewal, or otherwise as desired.

From the foregoing, it will be seen that when a vehicle with this design of bumper guard is inadvertently run against another vehicle bumper or vice versa, the initial colliding impact will be to a large extent absorbed by the resilient facings 7, it also being understood that said bumper guards extend both downwardly and upwardly a sufficient distance to prevent the main bumper 1 from engaging a corresponding bumper on another vehicle by overlying or underlying the same.

Fig. 5 illustrates another manner of constructing the bumper guard more particularly when produced in large quantities on a fast production basis, the rearward wall 8 and socket 9 being formed in spaced sections but integral with the side walls 5, and from the same pieces of material, a slot 17 being thereby formed midway between said side walls, through which the screw 10 extends, instead of through the hole 18, as shown in Fig. 3, it being understood that with either form of the invention, corresponding holes are provided in the main bumper for accommodating the screws 10.

Referring to Fig. 3, it will be noted that the portion of the strip 7 which is engaged by the gibs 6 is enlarged and is of dove-tail character, capable of being interlocked with said gibs.

While I have illustrated and described one form of construction for carrying my invention into effect, mainly by welding the fixed parts together, and another form with a lesser amount of welding, these forms are capable of further variation and modification without departing from the spirit of the invention. I, therefore, do not wish to be limited to the precise details of construction set forth, but desire to avail myself of such variation and modifications as come within the scope of the appended claims.

The invention claimed is:

1. In a bumper guard, an elongated rear wall formed with a concave seat and an aperture centrally of said seat, said seat being adapted to receive the convex front face of a bumper on which said guard is mounted while said aperture aligns with an opening in said bumper, a pair of spaced side walls secured to the outer edges of said rear wall and extending forwardly in converging relation, a backing plate secured to and extending between said side walls, an anchoring bolt having one end secured to a face of said backing plate and extending through said aperture in said rear wall, said side walls being continued forwardly of said backing plate in converging relation to provide cooperating gibs, a resilient facing strip confined by said backing plate and said gibs having a portion projecting beyond said gibs, a bottom plate secured to the lower edges of said rear wall, side walls and backing plate, and having a portion engaging the lower end of said resilient strip, a top plate secured to the upper edges of said rear wall, side walls and backing plate, and a retaining plate pivotally mounted on said top wall and adapted to engage the upper edge of said resilient strip to retain the latter in position.

2. In a bumper guard, an elongated rear wall formed with a concave seat substantially midway the ends thereof and with an aperture centrally of said seat, said seat being adapted to receive the convex front face of a bumper on which said guard is mounted with said aperture in alignment with an opening in said bumper, a pair of spaced side walls welded to the outer edges of said rear wall and extending forwardly in converging relation, a backing plate having its edges welded to said side walls and in parallel spaced relation to said rear wall, an anchoring bolt having one end welded to said backing plate and extending through said aperture, said side walls being continued forwardly of said backing plate in converging relation to provide cooperating gibs, a rubber strip confined by said backing plate and gibs, and having a portion projecting beyond said gibs, a bottom plate welded to the lower edges of said rear wall, side walls and backing plate and having a portion engaging the lower end of said rubber strip, a top plate welded to the upper edges of said rear wall, side walls and backing plate, and a retaining plate pivotally mounted on said top plate and normally engaging the upper end of said rubber strip to retain the latter in position.

3. In a bumper guard, an elongated rear wall adapted to assume a vertical position when mounted on a bumper, said rear wall being formed with a concave seat substantially midway the ends thereof and with an aperture centrally of said seat, said seat being adapted to receive the convex front face of a bumper on which said guard is mounted while said aperture aligns with an opening in said bumper, a pair of special vertical side walls secured to the outer edges of said rear wall and extending forwardly in converging relation to intermediate parallel side wall sections, a vertical backing plate having its edges secured to said parallel side wall sections, an anchoring bolt having one end secured to one face of said backing plate and extending through said aperture on said rear wall and adapted to pass through said opening in said bumper, a nut on the free end of said bolt, converging vertical gibs integrally joined to said parallel side wall sections, a resilient facing strip having a main body portion confined by said parallel side wall sections, said backing plate and said gibs and having a portion protruding beyond said gibs, a horizontal bottom plate secured to the lower edges of said rear wall, side walls, backing plate and gibs and having a portion positioned beneath said resilient strip, a horizontal top plate secured to the upper edges of said rear wall, side walls and backing plate, and a retaining plate pivotally mounted on said top plate and adapted to be positioned near said resilient strip to retain the latter in position.

WILLIAM S. BRAND.

REFERENCES CITED

The following references are of record in the file of this patent:

UNITED STATES PATENTS

| Number | Name | Date |
|---|---|---|
| 1,896,277 | Barry | Feb. 7, 1933 |
| 1,936,421 | Barry | Nov. 21, 1933 |
| 2,031,217 | Kernspecht | Feb. 18, 1936 |
| 2,144,167 | Sanders | Jan. 17, 1939 |
| 2,182,085 | Kellner et al. | Dec. 5, 1939 |